Oct. 14, 1947.   E. S. MacPHERSON   2,428,886
INTERNAL-COMBUSTION ENGINE
Filed Jan. 26, 1945

Inventor
Earle S. MacPherson
Attorneys

Patented Oct. 14, 1947

2,428,886

UNITED STATES PATENT OFFICE 2,428,886

INTERNAL-COMBUSTION ENGINE

Earle S. MacPherson, Detroit, Mich., assignor to General Motors Corporation, Detroit, Mich., a corporation of Delaware Application January 26, 1945, Serial No. 574,716

10 Claims. (Cl. 123—191)

The invention relates to internal combustion engines and is more particularly concerned with the form and arrangement of the cylinder head and piston and the disposition of the engine valves and ignition means whereby a novel design and construction of combustion chambers is effected.

The principal object of the invention is to provide means whereby relatively high compression ratios may be obtained, especially suitable for securing the advantages of high octane engine fuels.

A further object is to provide such proportions of combustion chamber elements as shall secure maximum smoothness of engine operation together with absence to a high degree of detonation or "knocking."

A further object is to provide an arrangement of engine elements whereby is obtained a particularly simple symmetrical design of combustion chamber lending itself readily to proper volume distribution to produce the desired rate of fuel combustion.

With these and other objects in view, as will appear from the following description, the invention comprises an overhead valve engine in which the combustion chamber is formed between a surface in the cylinder head into which the valves open and a piston the head of which is shaped to have minimum clearance over part of its area leaving a somewhat lune-shaped cavity into which the mixture is compressed.

The portion of the piston of minimum clearance approaches the roof of the combustion chamber so closely at top dead center as to constitute what may be termed a "quench area," substantially preventing flame spread in that area. This portion of the piston also overlaps the intake and exhaust valves enabling the cross sectional area of the combustion space at various distances from the spark plug to be varied at will regardless of space required for valves.

It will be understood that what is termed "engine roughness" may be caused by too rapid burning of the fuel mixture thus causing a shock due to too sudden exertion of force upon the piston and other parts of the engine. The rate of burning needs therefore to be controlled by varying the cross sectional area of the combustion chambers at various distances from the spark plug.

On the other hand, in order to avoid detonation, the major part of the combustion should be completed early in the firing period but the rate should taper off toward the end and the part of the mixture last burned should be confined in a relatively cooler portion of the chamber.

Since these considerations are somewhat antagonistic it will be appreciated that a desirable form of combustion chamber should provide for rapid but not too rapid combustion of a major portion of the mixture by proper disposition of the larger volume of the chamber close to the ignition means while the lesser and gradually decreasing volume should be disposed at successively greater distances from the point of ignition.

In the present invention the foregoing objects and desirable results are secured by a proportioning and arrangement of parts certain embodiments of which are shown in the accompanying drawings.

Referring to the drawings.

Figure 1:
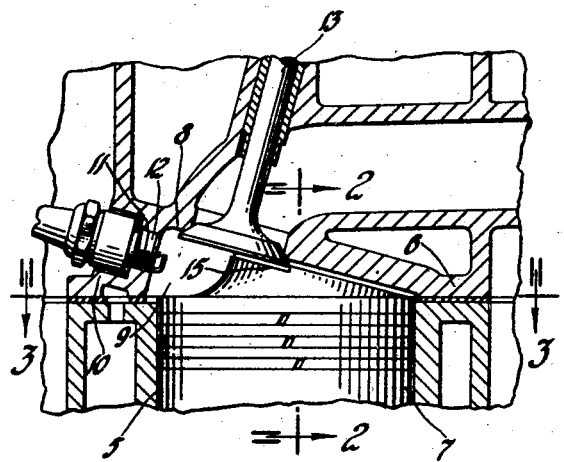
Figure 1 represents a cross-section through an engine cylinder, cylinder head and piston.

Referring first to Figures 1, 2 and 3, 5 designates a cylinder and 6 a cylinder head. A piston 7 is shown in approximately top dead center position in the cylinder. The cylinder head is formed with a recessed portion 8 between the walls of which and the head of the piston is the combustion chamber 9. The roof of this recessed portion is inclined upwardly or outwardly from one edge of the cylinder and reaches its greatest height at or toward the opposite edge. From the area of greatest height the wall of the recess drops again to the level of the cylinder providing a side wall 10 in which is an aperture 11 to receive ignition means 12.

Inlet and exhaust valves 13, 14, may be positioned in ports in the roof opening inwardly as is customary in valve-in-head engines. The valves are located near the highest part of the recessed head 8 and both are near the ignition means 12.

Figure 2:
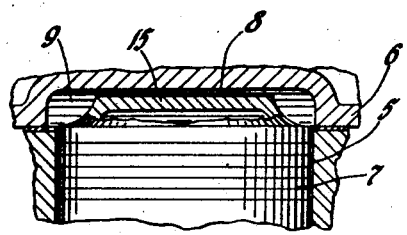
Figure 2 is a section on line 2—2 of Figure 1.
Figure 3:
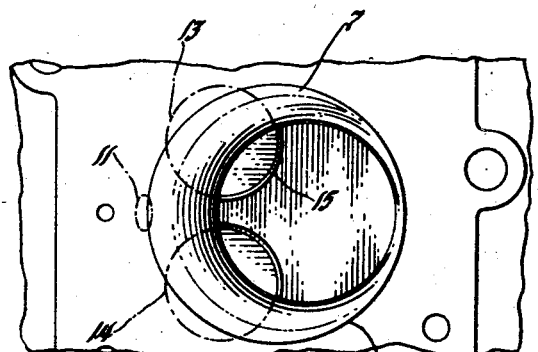
Figure 3 is a plan view showing the arrangement of parts of the structure represented in Figure 1.

The top of the piston 7 is formed with a raised portion 15, the top having a contour corresponding to that of the roof of the recessed portion 8 of the cylinder head. The top of the raised portion, which may be of approximately circular form as shown in Figure 2, approaches the roof of the recess with only the clearance required for mechanical reasons which will normally be less than one tenth inch. Thus a "quench area" is formed between the top of the raised portion 15 and the roof of the cylinder head in which, at top dead center, flame propagation is largely inhibited.

The raised area or area of minimum clearance extends from the side of the piston opposite the ignition means and adjacent to the shallower portion of the recess to and beyond the edges of the valves to whatever extent is necessary to provide the desired compression ratio. The compression space or combustion chamber 9 will accordingly be formed between the sides of the raised portion 15 and the walls of the recessed cylinder head 8. The greater cross-section of the chamber will be in the vicinity of the ignition means and directly under the valves and from this point will extend two arms or branches of tapering cross-section reaching substantially zero at the most remote and lowest point of the recessed head portion 8.

By locating the valves side by side in the roof of the recessed head 8 I secure several advantages. In the first place, since the form and proportions of the combustion or compression chamber herein provided are wholly independent of valve location, the determination of the volume (and resulting compression ratio) and specific proportions of the chamber is in no way affected by valve location or by recesses or wall formations designed to accommodate the valves. Furthermore, the valves are positioned to feed directly toward and exhaust directly from the major volume section of the combustion chamber thus securing to a maximum degree the advantages of the valve-in-head design.

Another important factor is the way in which the design facilitates the locating of the ignition means to secure desired results. If, for example, a single spark plug is employed, it may be positioned, as shown, approximately midway between the valve ports. As a result, since the ports are closely adjacent to each other, the flame front will quickly pass over the hot regions of the exhaust valve thus preventing any effect of these areas on detonation. At the same time the ignition point is sufficiently close to the inlet valve so that satisfactory operation with lean mixtures at part throttle may be obtained, a desideratum quite difficult to attain with many valve-in-head designs. On the other hand, if it be found desirable, the location of the spark plug nearer one port than the other is very easily effected or the use of a plurality of ignition devices is facilitated.

Figure 4:
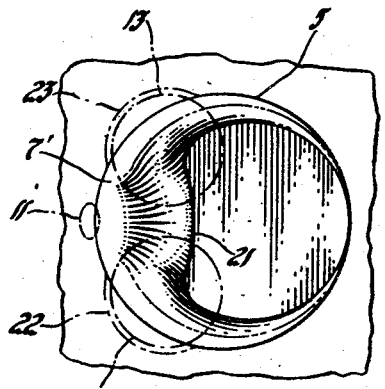
Figure 4 is a view similar to Figure 3 but showing a slightly modified structure.

In the form illustrated in Figure 4, the face of the raised portion of the piston is modified, as by cutting off or recessing the face, as at 21, to vary the volume adjacent to the valves and ignition means. Obviously similar modifications in the contour of other portions of the face of the raised portion will enable variations to be made in the volume of the two branches of the combustion space extending around the sides of the raised portion of the piston.

It will be seen also from Figure 4 that the space provided for the valves may extend beyond the cylinder area as at 22, 23, when ports and valves of larger area are desired and also that the length of the branches may be reduced.

The combustion or compression space described herein, as shown for example in Figures 2 and 4, has the shape, in plan, approximately of a lune or roughly of a horse-shoe with tapering ends. Thus a main portion or portion of major volume is provided immediately adjacent to the valve ports and ignition means from which two arms or branches lead around the sides of the piston tapering to a minimum at the side of the piston opposite the valves. Hence the major portion of the mixture will be burned within a short distance of flame propagation, the rate of burning, however, being controllable for any given engine by the contour of the adjacent face of the piston head. The remaining mixture portions burn at gradually decreasing rates of increase of burned volume, the last portions being burned in two tapering branches ending at the shallow side of the recess in the head in areas where the ratio of volume to wall area is least and the cooling effect is greatest. The tendency to produce detonation is thus lessened to a very great extent.

Attention is also called to the simplicity and compactness of design attained with the structure described and to the ready adaptability to any desired or pre-calculated compression ratio and volume distribution. The shape and size of the recess in the cylinder head may be substantially fixed and both compression space and volume distribution determined merely by contour of the piston head. Thus the structure is particularly adapted for engines utilizing high octane fuels and correspondingly high compression ratios. Turbulence during the compression stroke will obviously be great as the mixture is forced by the piston out of the minimum clearance areas.

I claim:

1. An internal combustion engine comprising a cylinder, a cylinder head having a recess therein above the cylinder, inlet and exhaust valves opening downwardly into said recess, and a piston in said cylinder, said piston having a raised portion approaching the roof of said recess at top dead center to form a quench space and separated from the roof at other points to form a combustion chamber of substantially lune shape in plan surrounding said raised portion.

2. Structure as set forth in claim 1, the said quench space overlapping the inlet and exhaust valves.

3. Structure as set forth in claim 1, the inlet and exhaust valves opening into the central and larger portion of the lune-shaped combustion chamber.

4. Structure as set forth in claim 1, the roof of said recess being substantially flat and the raised portion of the piston forming the quench space being substantially circular.

5. An internal combustion engine comprising a cylinder, a cylinder head having a recess therein above the cylinder, said recess having a roof inclined to the cylinder axis so as to be deeper at one side than at the other, inlet and exhaust valves opening downwardly into said deeper portion, a piston having a raised portion approaching said roof at top dead center to form a quench space overlapping said valves and separated from the roof at other points to form a combustion chamber having its larger cross-section in the deeper portion of the recess and two branches extending from said deeper portion around the sides of said raised portion of the piston.

6. Structure as set forth in claim 5, the roof of the recess being substantially flat and the flat top of the raised portion of the piston extending from the shallower edge of said recess toward the deeper portion.

7. Structure as set forth in claim 5 including ignition means centrally located in the combustion chamber, the branches of the combustion chamber being substantially symmetrically arranged relative to the ignition means and tapering toward their extremities.

8. An overhead valve internal combustion engine comprising a cylinder, a cylinder head with inlet and exhaust valves opening downwardly, a piston in said cylinder, piston and cylinder head being so shaped that a part of the piston head and a part of the combustion chamber wall contained in the cylinder head, at top dead center, are sufficiently close to one another to form a quench space, said quench space including portions of the combustion chamber into which both the inlet and exhaust valve open.

9. An internal combustion engine comprising a cylinder, a cylinder head having a recess therein above the cylinder, a piston in said cylinder having a central portion closely approaching said head at top dead center to form a quench space and separated from said head at other portions to form a combustion chamber of substantially lune shape in plan surrounding said quench space, said chamber having its major cross-section at its wider portion and its branches tapering toward their extremities, and intake and exhaust valves in said head opening downwardly into said wider portion of the chamber.

10. An internal combustion engine comprising a cylinder, a cylinder head having a recess therein above said cylinder, intake and exhaust valves opening downwardly into said recess, a piston having a central raised portion closely approaching the roof of said recess at top dead center to form a quench space, said space bounded by portions of said valves, said piston separated from the walls of said recess outside said raised portion to form a combustion chamber having a central portion of major volume and two tapering branches, said valves opening into said central portion, and ignition means located in said central portion.

EARLE S. MacPHERSON.

REFERENCES CITED

The following references are of record in the file of this patent:

UNITED STATES PATENTS

| Number | Name | Date |
|---|---|---|
| 1,758,686 | Bullington | May 13, 1930 |
| 1,839,560 | Kalb | Jan. 5, 1932 |
| 1,852,133 | Speer | Apr. 5, 1932 |

FOREIGN PATENTS

| Number | Country | Date |
|---|---|---|
| 525,879 | England | Sept. 6, 1940 |